US007337650B1

(12) United States Patent
Preston et al.

(10) Patent No.: US 7,337,650 B1
(45) Date of Patent: Mar. 4, 2008

(54) SYSTEM AND METHOD FOR ALIGNING SENSORS ON A VEHICLE

(75) Inventors: Dan Alan Preston, Bainbridge Island, WA (US); David N. Olmstead, Bainbridge Island, WA (US)

(73) Assignee: Medius Inc., Bainbridge Island, WA (US)

( * ) Notice: Subject to any disclaimer, the term of this patent is extended or adjusted under 35 U.S.C. 154(b) by 42 days.

(21) Appl. No.: 10/985,577

(22) Filed: Nov. 9, 2004

(51) Int. Cl.
*G01P 21/00* (2006.01)
(52) U.S. Cl. ...................................... 73/1.38
(58) Field of Classification Search .............. 73/1.38; 89/41.19; 701/70, 23; 180/167
See application file for complete search history.

(56) References Cited

U.S. PATENT DOCUMENTS

| | | | | |
|---|---|---|---|---|
| 2,995,318 A * | 8/1961 | Cocharo | .................... | 244/3.16 |
| 4,303,978 A * | 12/1981 | Shaw et al. | ................. | 701/220 |
| 5,031,330 A | 7/1991 | Stuart | ..................... | 33/366.12 |
| 5,245,909 A | 9/1993 | Corrigan et al. | ........... | 89/41.19 |
| 5,438,361 A * | 8/1995 | Coleman | ................. | 348/208.7 |
| 6,202,027 B1 | 3/2001 | Alland et al. | ............... | 701/301 |
| 6,243,450 B1 | 6/2001 | Jansen et al. | .......... | 379/144.01 |
| 6,484,080 B2 * | 11/2002 | Breed | .......................... | 701/36 |
| 6,778,924 B2 * | 8/2004 | Hanse | ......................... | 702/88 |
| 6,782,315 B2 * | 8/2004 | Lu et al. | ....................... | 701/45 |
| 2003/0009270 A1* | 1/2003 | Breed | .......................... | 701/29 |
| 2003/0201929 A1* | 10/2003 | Lutter et al. | ................. | 342/52 |
| 2004/0149036 A1* | 8/2004 | Foxlin et al. | ................ | 73/511 |
| 2004/0164228 A1* | 8/2004 | Fogg et al. | ............. | 250/208.1 |
| 2005/0080543 A1* | 4/2005 | Lu et al. | ....................... | 701/70 |

FOREIGN PATENT DOCUMENTS

EP     1355128 A1 *  10/2003

OTHER PUBLICATIONS

Product description of Raytheon RT Secure, "Embedded Hard Real-Time Secure Operating System", Copyright 2000, pp. 1-2.
Product description of Raytheon RT Secure, Copyright 2001, pp. 1-2.
Product description of Raytheon RT Secure, "Development Environment", Copyright 2001, pp. 1-2.
Product description of Raytheon Electronic Systems (ES), Copyright 2002, pp. 1-2.
H. Chung, L. Ojeda, and J. Borenstein, "Sensor Fusion for Mobile Robot Dead-reckoning with a Precision-calibrated Fiber Optic Gyroscope", 2001 IEEE International Conference on Robotics and Automation, Seoul, Korea, May 21-26, pp. 1-6.

(Continued)

*Primary Examiner*—Hezron Williams
*Assistant Examiner*—Tamiko Bellamy
(74) *Attorney, Agent, or Firm*—Marger Johnson & McCollom, P.C.

(57) ABSTRACT

A vehicle sensor system consisting of video, radar, ultrasonic or laser sensors, oriented to obtain a 360 degree view around the vehicle for the purpose of developing a situation or scene awareness. The sensors may or may not have overlapping field of views, or support the same applications, but data will be shared by all. Orientation of the sensor to the vehicle body coordinates is critical in order to accurately assess threat and respond. This system describes methods based on measuring force and rotation on each sensor and computing a dynamic alignment to first each other, then second to the vehicle.

58 Claims, 9 Drawing Sheets

Alignment using micro-inertials and an optical sensor

OTHER PUBLICATIONS

A. Das, R. Fierro, V. Kumar, J. Ostrowski, J. Spletzer, and C. Taylor, "A Framework for Vision Based Formation Control", IEEE Transactions on Robotics and Automation, vol. XX, No. Y, 2001, pp. 1-13.

J. Takezaki, N. Ueki, T. Minowa, H. Kondoh, "Support System for Safe Driving—A Step Toward ITS Autonomous Driving—", Hitachi Review, vol. 49, No. 3, 2000, pp. 1-8.

S.G. Goodridge, "Multimedia Sensor Fusion for Intelligent Camera Control and Human-Computer Interaction", Dissertation submitted to the Graduate Faculty of North Carolina State University in partial fulfillment of the requirements for the degree of Doctor of Philosophy in Electrical Engineering, Raleigh NC, 1997, pp. 1-5.

M. Chantler, G. Russel, and R. Dunbar, "Probabilistic Sensor Fusion for Reliable Workspace Sensing", pp. 1-14

ISIS Project: Sensor Fusion, Linkoping University Division of Automatic Control and Communication Systems in cooperation with SAAB (Dynamics and Aircraft), 18 pages.

Hitachi Automated Highway System (AHS), Automotive Products, Hitachi, Ltd., Copyright 1994-2002, 8 pages.

Vehicle Dynamics Lab, University of California, Berkeley, funded by BMW, current members: D. Caveney and B. Feldman, "Adaptive Cruise Control", 17 pages.

Counterair: The Cutting Edge, Ch. 2 "The Evolutionary Trajectory The Fighter Pilot-Here to Stay?" AF2025 v3c8-2, Dec. 1996, pp. 1-7.

Counterair: The Cutting Edge, Ch. 4 "The Virtual Trajectory Air Superiority without an "Air" Force?" AF2025 v3c8-4, Dec. 1996, pp. 1-12.

TNO FEL Annual Review 1998: Quality works, 16 pages.

Boeing News Release, "Boeing Demonstrates JSF Avionics Multi-Sensor Fusion", Seattle, WA, May 9, 2000, pp. 1-2.

Boeing Statement, "Chairman and CEO Phil Condit on the JSF Decision", Washington, D.C., Oct. 26, 2001, pp. 1-2.

Ada 95 Transition Support—Lessons Learned, Sections 3, 4, and 5, CACI, Inc.—Federal, Nov. 15, 1996, 14 pages.

Joint Strike Fighter Terrain Database, ets-news.com "Simulator Solutions" 2002, 3 pages.

MSRC Redacted Proposal, 3.0 Architecture Development, pp. 1-43.

Powerpoint Presentation by Robert Allen—Boeing Phantom Works entitled "Real-Time Embedded Avionics System Security and COTS Operating Systems", Open Group Real-Time Forum, Jul. 18, 2001, 16 pages.

Green Hills Software, Inc., "The AdaMULTI 2000 Integrated Development Environment", Copyright 2002, 7 pages.

\* cited by examiner

Figure 1: Alignment of sensors and the vehicle

Figure 2: Pitch misalignment Angle Computation

Figure 3: Yaw Misalignment Angle Computation

Figure 4: Roll misalignment Angle Computation

Figure 5: Optical Image – Level

Figure 6: Center of Hood, level, magnified 12 times

Figure 7: Optical Image – Banked left

Figure 8: Center of Hood, banked left, magnified 8 times

Figure 9: Optical Image – Yaw left

Figure 10: Alignment where all sensors have micro-inertials

Figure 11: Alignment using micro-inertials and an optical sensor

Figure 12: Alignment where all of the sensors are optical

Figure 13: Alignment where the sensors are on a common platform

SYSTEM AND METHOD FOR ALIGNING SENSORS ON A VEHICLE

RELATED FILINGS

This application incorporates by reference U.S. Pat. No. 6,629,033, Issued Sep. 30, 2003 Titled—OPEN COMMUNICATION SYSTEM FOR REAL-TIME MULTIPROCESSOR APPLICATIONS, U.S. Pat. No. 6,771,208, Issued Aug. 3, 2004 Titled—MULTI SENSOR SYSTEM, and U.S. patent application Ser. No. 09/841,915, filed Apr. 24, 2001 entitled: METHOD AND APPARATUS FOR DYNAMIC CONFIGURATION OF MULTIPROCESSOR SYSTEM

REFERENCES CITED

U.S. Patent Documents
U.S. Pat. No. 5,245,909 May 7, 1990; Title: Automatic Sensor Alignment; Inventors: Corrigan; John D. (Bridgeton, Mo.); Simmons, Jr.; Dennis E. (St. Louis, Mo.); Berg; Robert L. (St. Louis, Mo.); Assignee: McDonnell Douglas Corporation (MD)
U.S. Pat. No. 6,202,027 Mar. 13, 2001; Title: Automatic curve sensor calibration method for an automotive CW/ICC system; Automatic curve sensor calibration method for an automotive CW/ICC system
U.S. Pat. No. 5,031,330 Jul. 16, 1991; Title: Electronic Boresight; Inventors: Stuart; Kenneth (Los Altos Hills, Calif.)
Assignee: Kaiser Aerospace & Electronics Corporation (Oakland, Calif.)
Other References
Product description of Raytheon RT Secure, "Embedded Hard Real-Time Secure Operating System", Copyright 2000, pp. 1-2.
Product description of Raytheon RT Secure, Copyright 2001, pp. 1-2.
Product description of Raytheon RT Secure, "Development Environment", Copyright 2001, pp. 1-2.
Product description of Raytheon Electronic Systems (ES), Copyright 2002, pp. 1-2.
H. Chung, L. Ojeda, and J. Borenstein, "Sensor Fusion for Mobile Robot Dead-reckoning with a Precision-calibrated Fiber Optic Gyroscope", 2001 IEEE International Conference on Robotics and Automation, Seoul, Korea, May 21-26, pp. 1-6.
A. Das, R. Fierro, V. Kumar, J. Ostrowski, J. Spletzer, and C. Taylor, "A Framework for Vision Based Formation Control", IEEE Transactions on Robotics and Automation, vol. XX, No. Y, 2001, pp. 1-13.
J. Takezaki, N. Ueki, T. Minowa, H. Kondoh, "Support System for Safe Driving—A Step Toward ITS Autonomous Driving-", Hitachi Review, vol. 49, No. 3, 2000, pp. 1-8.
S. G. Goodridge, "Multimedia Sensor Fusion for Intelligent Camera Control and Human-Computer Interaction", Dissertation submitted to the Graduate Faculty of North Carolina State University in partial fulfillment of the requirements for the degree of Doctor of Philosophy in Electrical Engineering, Raleigh, N.C., 1997, pp. 1-5.
M. Chantler, G. Russel, and R. Dunbar, "Probabilistic Sensor Fusion for Reliable Workspace Sensing", pp. 1-14.
ISIS Project: Sensor Fusion, Linkoping University Division of Automatic Control and Communication Systems in cooperation with SAAB (Dynamics and Aircraft), 18 pp.
Hitachi Automated Highway System (AHS), Automotive Products, Hitachi, Ltd., Copyright 1994-2002, 8 pages.
Vehicle Dynamics Lab, University of California, Berkeley, funded by BMW, current members: D. Caveney and B. Feldman, "Adaptive Cruise Control", 17 pages.
Counterair: The Cutting Edge, Ch. 2 "The Evolutionary Trajectory The Fighter Pilot-Here to Stay?" AF2025 v3c8-2, December 1996, pp. 1-7.
Counterair: The Cutting Edge, Ch. 4 "The Virtual Trajectory Air Superiority without an "Air" Force?" AF2025 v3c8-4, December 1996, pp. 1-12.
TNO FEL Annual Review 1998: Quality works, 16 pages.
Boeing News Release, "Boeing Demonstrates JSF Avionics Multi-Sensor Fusion", Seattle, Wash., May 9, 2000, pp. 1-2.
Ada 95 Transition Support—Lessons Learned, Sections 3, 4, and 5, CACI, Inc.—Federal, Nov. 15, 1996, 14 pages.
Joint Strike Fighter Terrain Database, ets-news.com "Simulator Solutions" 2002, 3 pages.
MSRC Redacted Proposal, 3.0 Architecture Development, pages 1-43.
Powerpoint Presentation by Robert Allen—Boeing Phantom Works entitled "Real-Time Embedded Avionics System Security and COTS Operating Systems", Open Group Real-Time Forum, Jul. 18, 2001, 16 pages.
Green Hills Software, Inc., "The AdaMULTI 2000 Integrated Development Environment", Copyright 2002, 7 pages.

BACKGROUND

Next generation automotive systems such as Lane Departure Warning (LDW), Collision Avoidance (CA), Blind Spot Detection (BSD) or Adaptive Cruise Control (ACC) systems will require target information from multiple sensors including a new class of sensor called sensor apertures such as radar, image or laser, similar to those found on advanced tactical fighter aircraft. For example, one sensor aperture may be located on the front bumper of the vehicle and obtains range and azimuth information about vehicles and stationary objects in front of the vehicle. Another sensor aperture may be located on the dash of the vehicle and obtains image information about vehicles and stationary objects in front of the vehicle. Another sensor aperture may be located on the side of the vehicle and obtains either range and azimuth data or image data in order to determine velocity and track information on vehicles that pass the vehicle. These new systems must take all of the information from the multiple sensors apertures on the vehicle and compute an accurate picture of the moving objects around the vehicle; this is known as kinematic state of the targets, or Situation Awareness (SA). To do this the Situation Awareness Platform (SAP) must accurately align the sensors apertures to each other so that information about a target from one sensor aperture can be used with information about the target from a different sensor aperture. This is called Sensor Fusion (SF), this is necessary for the SAP to get an optimal kinematic state of the targets around the vehicle in order to assess threat. The sensor apertures must also be aligned to the body of the vehicle so that the SAP can determine the position and velocity of the target with respect to the vehicle; this is called Navigation Fusion (NF).

One method of aligning the sensors apertures to each other and to the vehicle is to use mechanical and optical instruments, such as auto-collimators and laser boresight tools, during the production of the vehicle. This technique is not only costly, but would be require if a sensor aperture were repaired or replaced after production. An alignment procedure would have to be performed again in order to assure the safety critical systems were reporting accurately. Also as the vehicle goes through normal wear and tear the sensor apertures would start to become misaligned and may not be noticed by the operator. This means that the data from the sensor apertures would not correlate with each other and the vehicle reference frame until the sensor apertures were aligned again. Again, this would be costly to the vehicle operator and until performed, the SAP may not provide accurate data. Therefore, a method to align the sensor apertures to each other and to the vehicle without the use of sophisticated optical tools is required. This patent addresses this problem by describing methods that can be used to align the sensor apertures to each other and to the vehicle that do not require external alignment equipment.

In a discussion of Prior Art, U.S. Pat. No. 5,245,909, Automatic Sensor Alignment, relates to systems for maintaining alignment-sensitive aircraft-borne avionics and weapons sensors in precise alignment. It further relates to methods for precisely aligning sensitive avionics for weapons system instrumentation, which is subject to vibrations causing misalignment. Whereas this disclosure relates to methods and systems that support advanced automotive systems not described in the prior art. A second key difference is the reliance of sensor data from the vehicle as part of the alignment method. Another difference is using image apertures with elements of the vehicle in the field of view of the imager and employing optical methods for determining changes to the alignment with respect to the vehicle and vehicle reference frame, then applying a compensation based on the misalignment angle measured. Finally, this system described herein does not require a reliance on boresighting and aligning any sensor to achieve a vehicle reference frame.

U.S. Pat. No. 6,202,027, Automatic Curve Sensor Calibration, describes an improved system for accurately determining the travel path of a host vehicle and the azimuth angle of a target vehicle through an automatic calibration that detects and compensates for misalignment and curve sensor drift. The difference is a reliance on observed objects and track file generation and subsequent changes to the track files over time. Whereas this patent teaches methods of alignment based force vectors, rotational rates or optically measured changes with respect to the vehicle reference frame. Essentially all observed objects are compensated for misalignment error on the observing vehicle.

U.S. Pat. No. 5,031,330, Electronic Boresight, teaches that pairs of level sensing devices can be used in a method that aligns plane surfaces to one another by tilting platforms equal to the amount misalignment measured to adjust the sensor azimuth. Whereas this patent teaches that the sensor apertures are rigidly mounted to the vehicle and correction to misalignment is done by compensation values observed with respect to the vehicle reference frame.

SUMMARY OF THE INVENTION

A vehicle sensor system configured to gather sensory data 360 degrees around the vehicle, comprising of sensor apertures for gathering data such as: range (e.g. ultrasonic); range and azimuth (e.g. laser and/or radar); images (e.g. optical and/or thermal). The vehicle has sensors that align and establish a vehicle reference frame by measuring body yaw, pitch and roll rates as well as acceleration along the 3 axes of the vehicle. The imaging apertures that have a clear view of body mold lines, like hood or rear deck, will align themselves to the vehicle reference frame, those apertures that can not align using optical methods are aligned to the vehicle using accelerometers and rates sensors by reading the inertial acceleration or angular rotation to align themselves to each other. An Integrated Computing Platform (ICP) hosts the SAP software that maintains complete system alignment by determining differences in alignment and applying or updating a compensation value with respect to the vehicle body coordinates resulting in a dynamically boresighted system.

DETAILED DESCRIPTION

Figure 1:
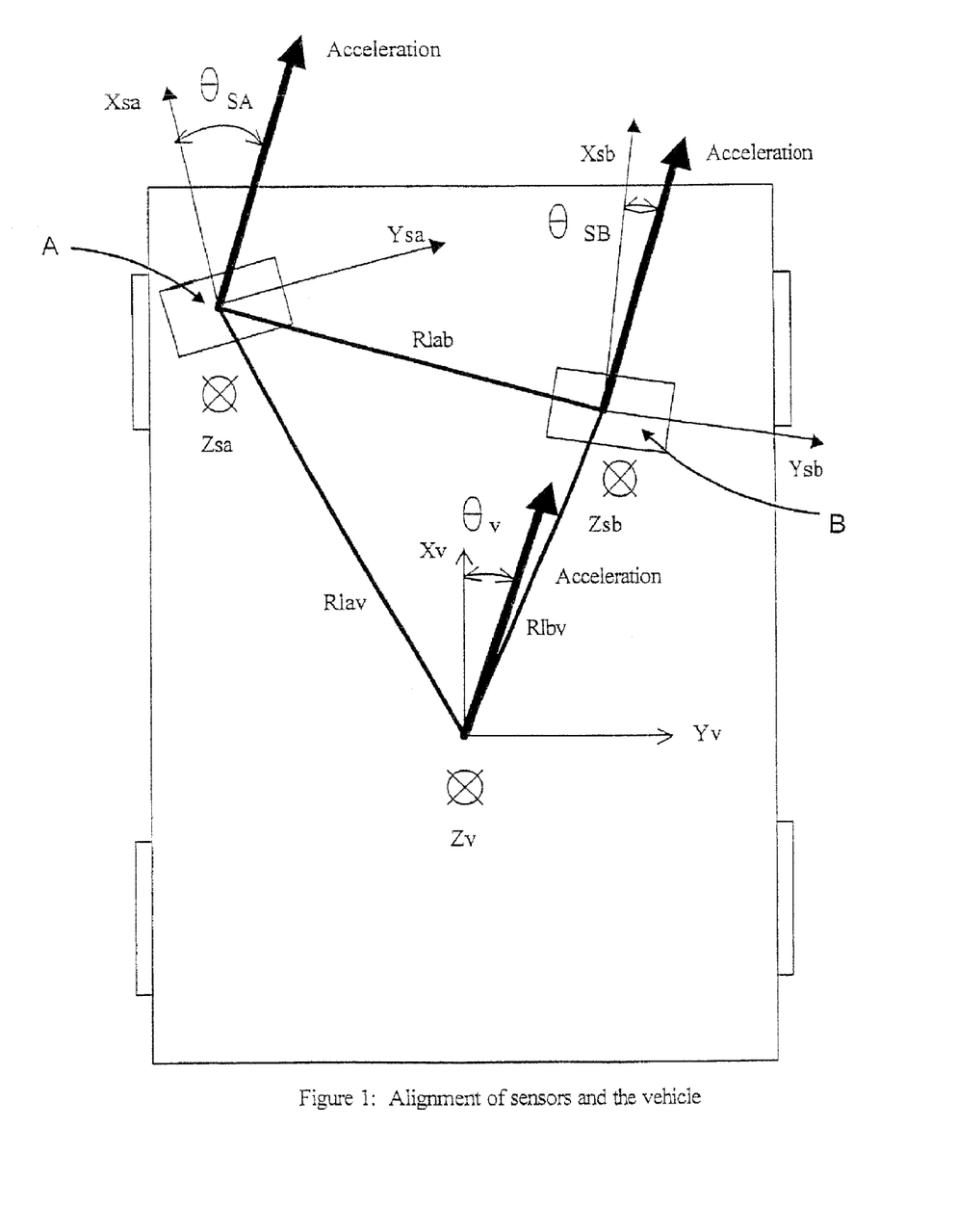
FIG. 1 is a diagram showing how a common inertial acceleration is sensed by accelerometers on each sensor and can be used to align the sensor coordinate frames.

One method is to attach three axis accelerometers to each sensor and to the vehicle and use gravity and the acceleration of the vehicle, which will be sensed by the accelerometers, to align the sensor axes to each other and to the vehicle. Information from the vehicle that is available on the Car Area Network (CAN) bus will also be used to perform the calculation of the misalignment angles. FIG. 1 shows in two dimensions the relation between sensor aperture A frame, sensor aperture B frame and the vehicle body reference frame. There are two accelerometers that sense acceleration in the X and Y axes of the sensor apertures and vehicle. This problem can easily be expanded to three dimensions with another accelerometer located in the Z-axes of each sensor and vehicle.

In FIG. 1 the vehicle experiences a linear acceleration and this common acceleration is observed by the accelerometers located on sensor aperture A, sensor aperture B and the vehicle body. The accelerometers that are attached to the vehicle body are aligned to the vehicle body reference frame. By taking the difference in acceleration data from the accelerometers on sensor aperture A and sensor aperture B and inputting this data in a Kalman Filter, the misalignment angle between the two sensor apertures, $\theta sa-\theta sb$, can be computed. The same can be done between sensor aperture A and the vehicle body, and sensor aperture B and the vehicle body to compute all of the misalignment angles. This approach can be used to compute the three dimensional misalignment angles of roll, pitch and yaw between sensor apertures and the vehicle body reference frame.

The same approach can be used when the vehicle is turning and each accelerometer group experiences a centripetal acceleration. However, in this case the difference in accelerations must be compensated by the centripetal acceleration resulting from the lever arm vector between the two sensor apertures and the angular rotation of the vehicle. The angular rotation of the vehicle is sensed by a gyro triad or micro-inertial device located at the vehicle body reference frame $$Acomp = A\text{sensor}a - w \times w \times R1$$

The input to the Kalman filter is now:

$$Acomp - A\text{sensor}b$$

where:
- Asensora is the acceleration measured by sensor A accelerometers
- Asensorb is the acceleration measured by sensor B accelerometers
- w is the angular rotation of the vehicle measured by the ref gyros
- x is the cross product of two vectors
- R1 is the lever arm vector between sensor A and sensor B
- Acomp is the sensor acceleration compensated for lever arm rotation Also if the vehicle is stationary, the accelerometer groups will sense gravity and this can be used to help compute some of the misalignment angles. Information from the vehicle CAN bus, such as wheel rotation speeds are zero, will tell the Kalman filter that the vehicle is not moving and the only sensed acceleration will be from gravity.

Figure 10:
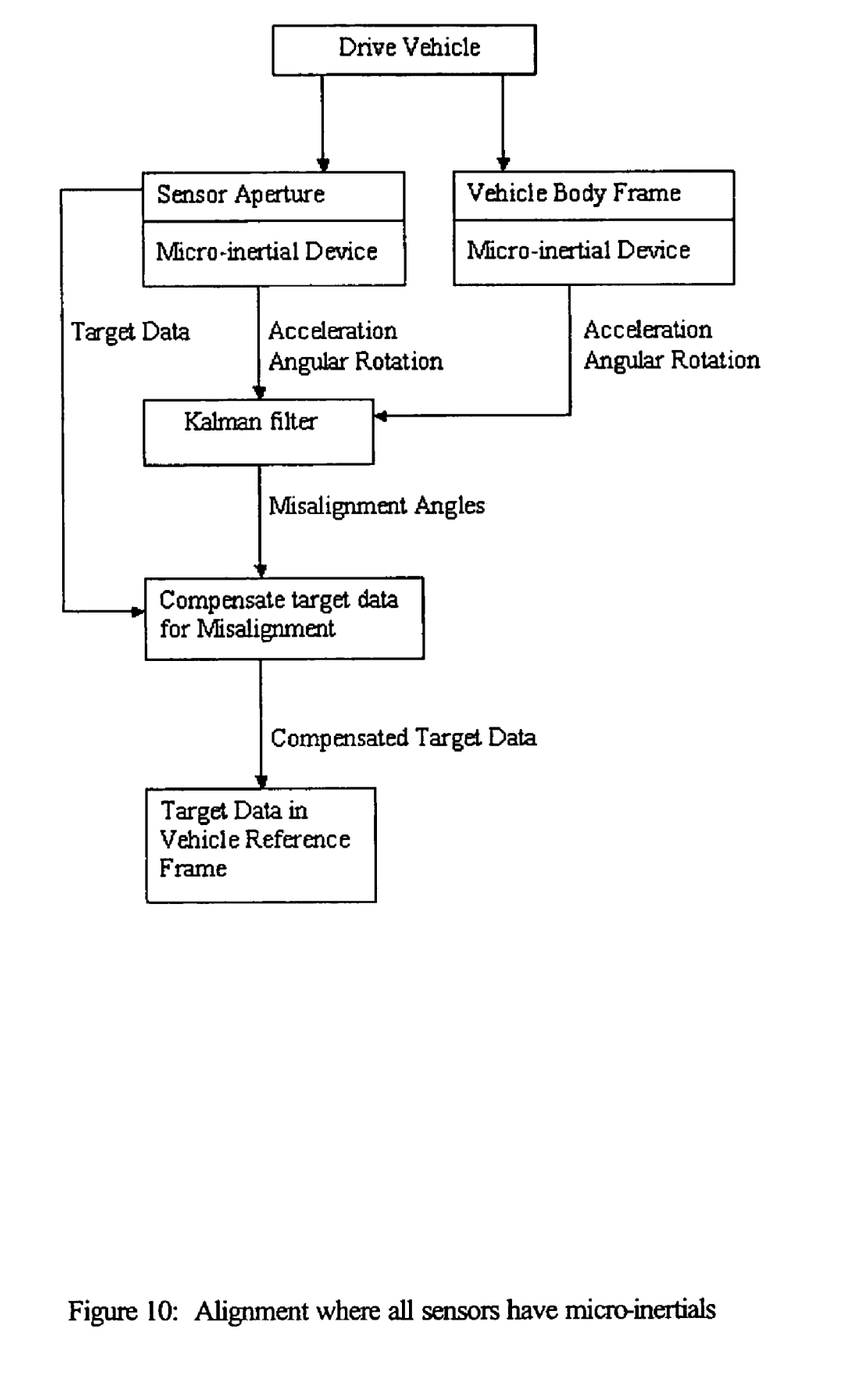
FIG. 10 is a flow chart that shows the alignment process when all sensors have micro-inertials.

FIG. 10 is a flow chart showing the process when all of the sensor apertures, as well as the vehicle body, have a micro-inertial attached to them. When the vehicle is moving, the micro-inertials sense the angular rotation and/or acceleration of the vehicle and this information is the input to a Kalman filter. The filter uses this information to estimate the roll, pitch and yaw misalignment angles between a sensor aperture and the vehicle body frame. These misalignment angles are then used to rotate the sensor target data into the vehicle body frame. With all of the target data in a common reference frame the processor can fuse data from several sensors into an optimal target track file.

The second method is to use accelerometers to align the sensor apertures to each other and one of the sensor apertures is aligned to the vehicle body by using optical information from the sensor aperture itself. For example, acceleration data can be used to align sensor aperture A to sensor aperture B, but sensor aperture B is aligned to the vehicle body directly by using sensor aperture B to compute the misalignment angles between sensor aperture B and the vehicle body. Since sensor aperture A is aligned to sensor aperture B and sensor aperture B is aligned to the vehicle body, you can compute the misalignment between sensor aperture A and the vehicle body. Sensor aperture B can be a visual sensor aperture, such as a video camera, and by observing the outline of the hood and body of the vehicle using this camera, you can compute the misalignment angles between sensor aperture B and the vehicle body frame.

Figure 2:
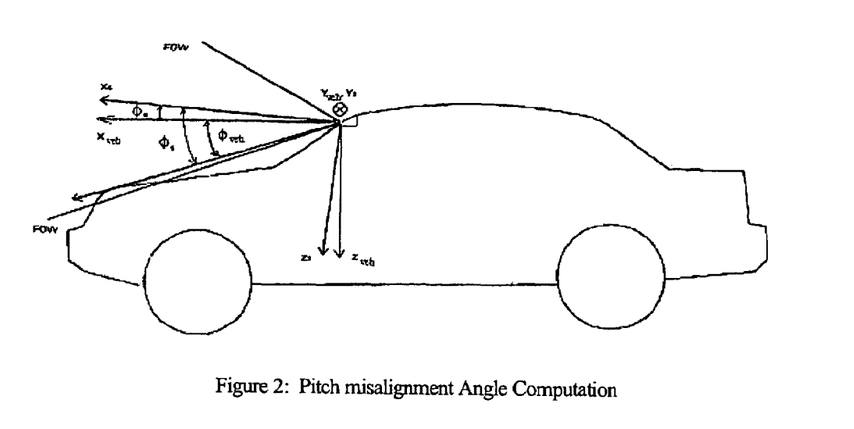
FIG. 2 is a diagram showing the pitch angles used to determine the pitch misalignment angle of the optical sensor.
Figure 5:
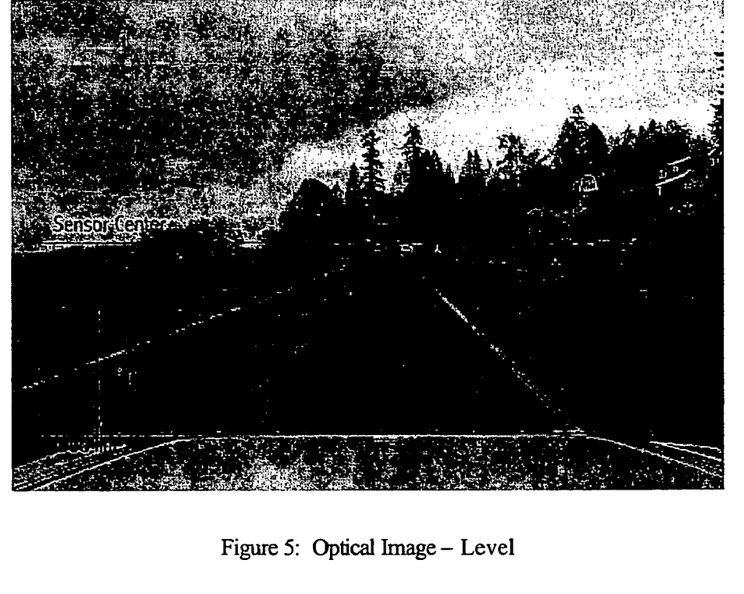
FIG. 5 is an image showing the top of the hood and how it is used to compute the pitch misalignment angle.
Figure 6:
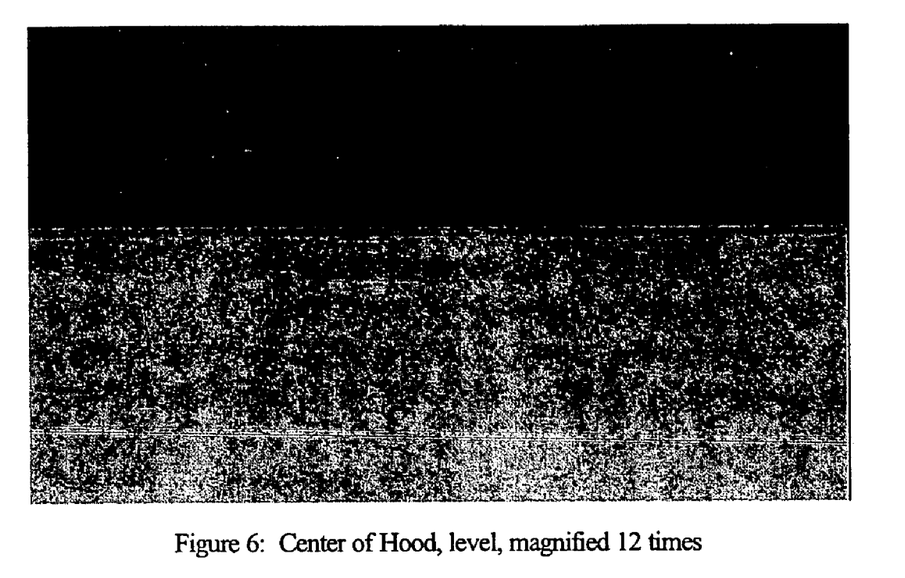
FIG. 6 is a magnified image of the hood line showing the pixels of the image.

FIG. 2 shows that the pitch misalignment angle is the angle between the sensor aperture's X-axis and vehicle's X-axis in the vertical plane. The pitch angle between the vehicle X-axis and a line from the sensor aperture to the top point of the hood, Φvehicle, can be computed from the vehicle's dimensions. The image from the sensor aperture, FIG. 5 for example, shows the top of the hood. By counting the pixels from the center of the image down to the hood, Pp, the sensor aperture pitch angle can be computed. Using a 480×640 pixel image, this angle can be computed to within 1 pixel, see FIG. 6. With a vertical field of view, FOVv, the pitch angle is:

$$\Phi s = (Pp/480) * FOVv$$

The pitch misalignment angle is:

$$\Phi\text{misalign} = \Phi s - \Phi\text{vehicle}$$

Figure 3:
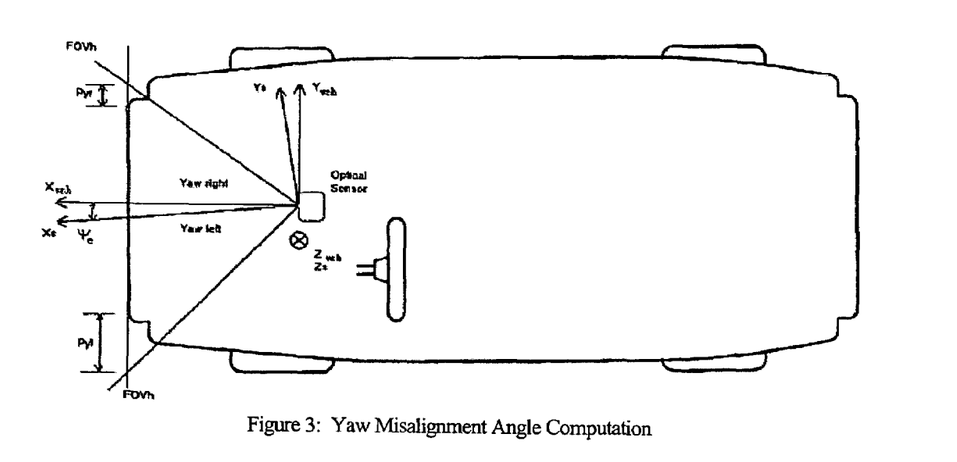
FIG. 3 is a diagram showing the yaw data that is used to determine the yaw misalignment angle of the optical sensor.
Figure 9:
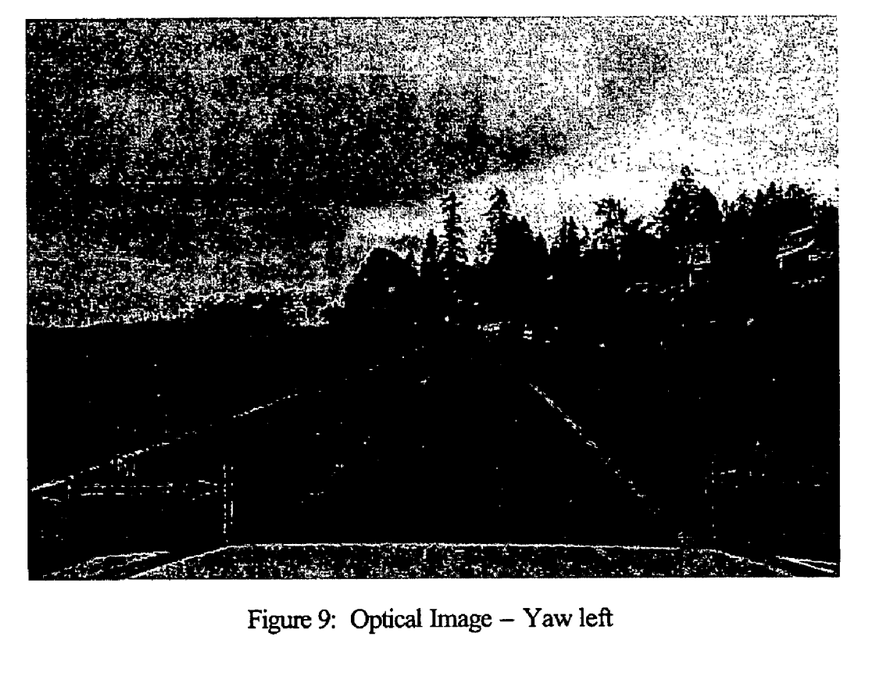
FIG. 9 is an image showing the top of the hood and how it is used to compute the yaw misalignment angle.

FIG. 3 shows that the small yaw misalignment angle is the angle between the sensor aperture's X axis and vehicle's X axis in the horizontal plane. The sensor aperture image shows the left and right edges of the hood, FIG. 9. By computing the pixels from the left hood edge or mark on the hood to the left of the image border, Pyl, and the right hood edge or mark to the right border, Pyr, the yaw angle of the sensor aperture misalignment with a horizontal field of view, FOVh is:

$$\Psi\text{Misalign} = ((Pyl - Pyr)/2*640) * FOVh$$

Figure 4:
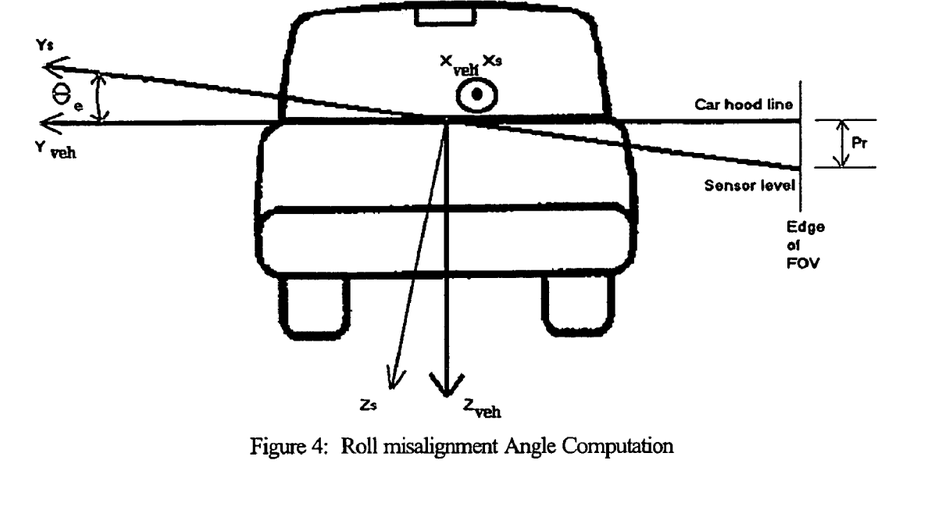
FIG. 4 is a diagram showing the roll data that is used to determine the roll misalignment angle of the optical sensor.
Figure 7:
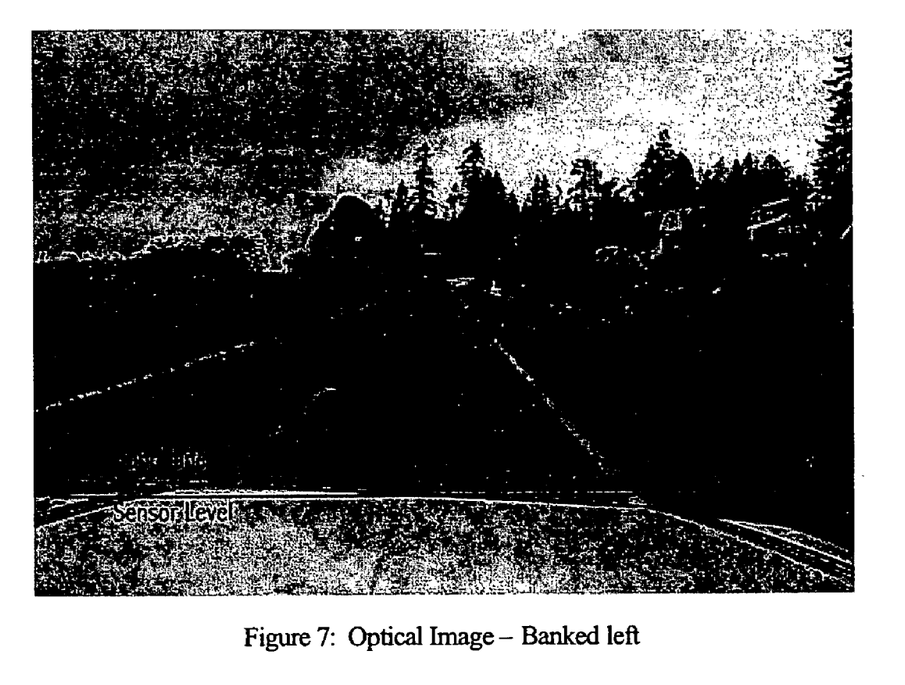
FIG. 7 is an image showing the top of the hood and how it is used to compute the roll misalignment angle.

FIG. 4 shows that the small roll misalignment angle is the angle between the sensor aperture's Y-axis and vehicle's Y-axis in the vertical plane. The sensor aperture image shows that the hood line and the sensor aperture level lines cross to form the roll misalignment angle. This is shown in FIG. 7. By measuring the pixels between the two lines at the edge of the image, Pr, the roll misalignment angle can be computed as follows:

$$\Theta\text{Misalign} = (2*Pr/640) * 180/\pi$$

Figure 8:
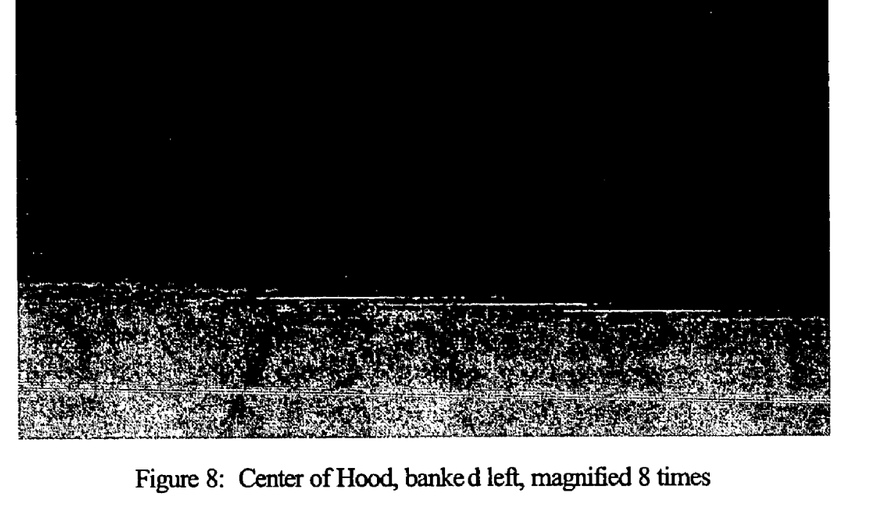
FIG. 8 is a magnified image of the banked hood line showing the pixels of the image.

FIG. 8 shows that the hood line can be determined accurately to within a couple of pixels.

Figure 11:
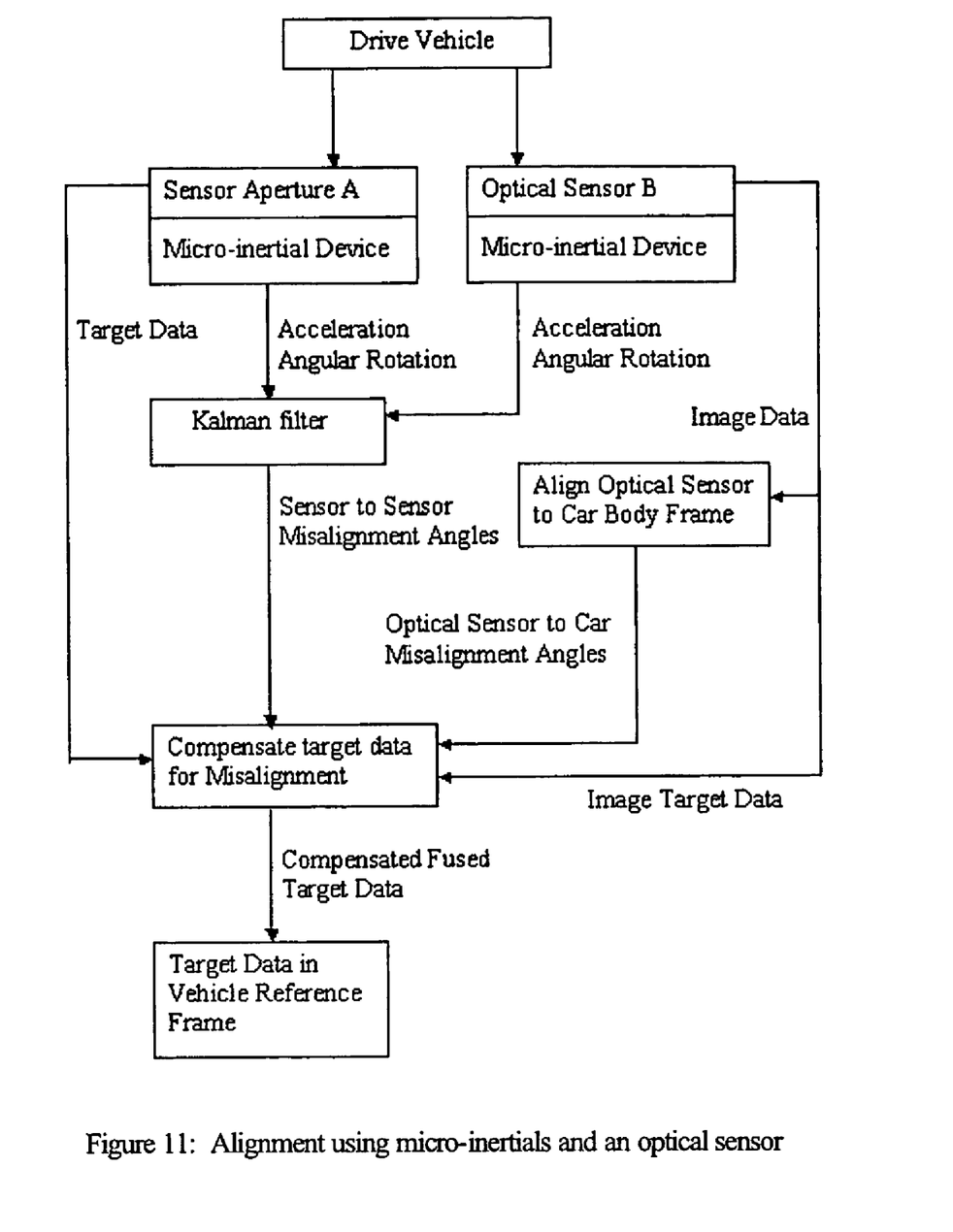
FIG. 11 is a flow chart that shows the alignment process when using micro-inertials and an optical sensor.

FIG. 11 is a flow chart showing the process when at least one of the sensors is an optical device. All of the sensors have a micro-inertial attached to them. The optical device can see the targets and the outline of features of the vehicle, such as the hood line. The optical sensor uses the hood line information to compute the roll, pitch and yaw misalignment angles between the optical sensor frame and the vehicle body frame.

When the vehicle is moving, the micro-inertials sense the angular rotation and/or acceleration of the vehicle. Like FIG. 10, the Kalman filter estimates the roll, pitch and yaw misalignment angles between a sensor aperture frame and the optical sensor frame. These misalignment angles as well as the misalignment angles between the optical sensor and the vehicle body frame are then used to rotate all of the sensor target data into the vehicle body frame. Again, with all of the target data in a common reference frame the processor can fuse data from several sensors into an optimal target track file.

A third method is to use optical information from sensor aperture A and sensor aperture B to compute the misalignment between the two sensor apertures and to use optical information from sensor aperture B to compute the misalignment between sensor aperture B and the vehicle body. For example, sensor aperture A can be a ranging laser sensor aperture and it sends out multiply beams of light to detect a target. When the light is reflected from the target, sensor aperture B can also detect the reflected light in its video camera and using this information it can compute the misalignment between sensor aperture A and sensor aperture B.

Figure 12:
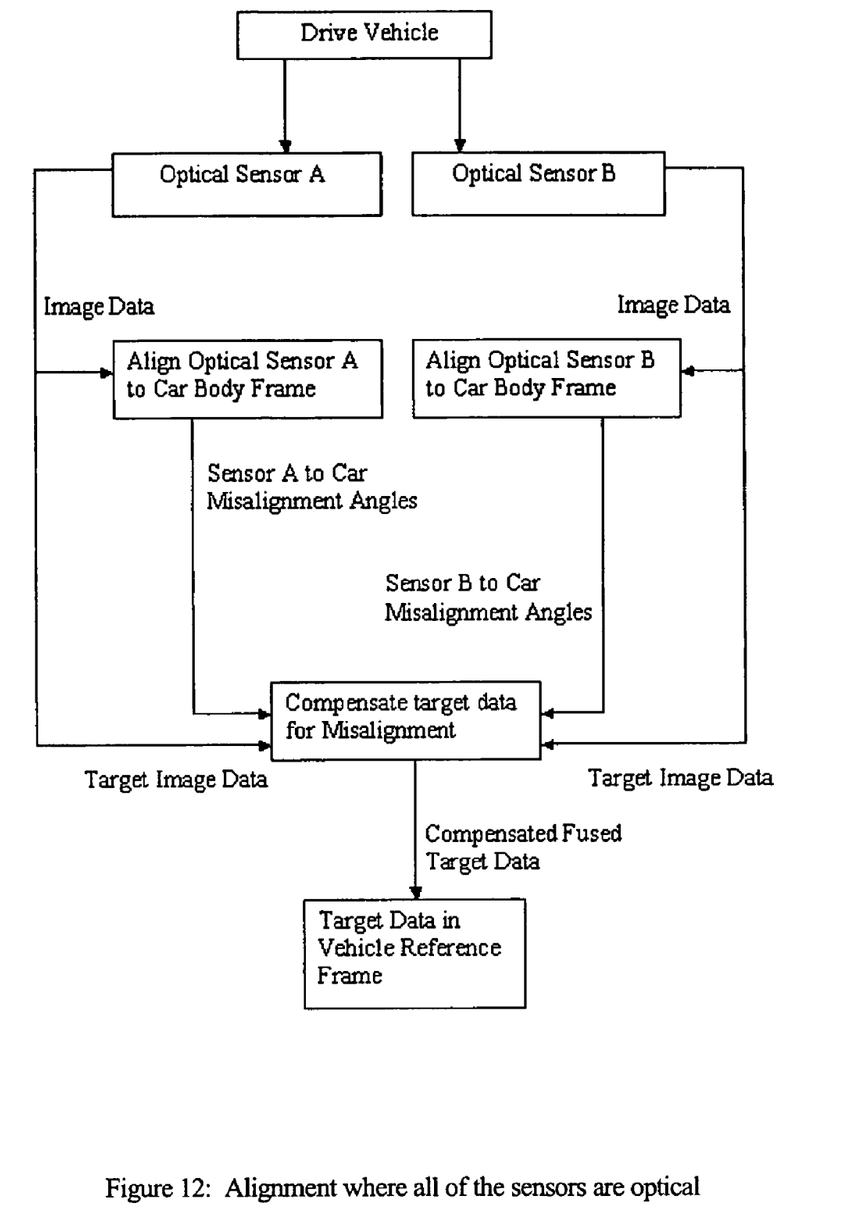
FIG. 12 is a flow chart that shows the alignment process when all of the sensors are optical.

FIG. 12 is a flow chart showing the process when all of the sensors on the vehicle are optical sensors. Each optical device can see targets and the outline of features of the vehicle, such as the hood or truck line. The optical sensors use this vehicle body information to compute the roll, pitch and yaw misalignment angles between the optical sensor frame and the vehicle body frame. These misalignment angles are then used to rotate the sensor target data from each sensor into the vehicle body frame. Like the two cases above, with all of the target data in a common reference frame the processor can fuse data from several sensors into an optimal target track file.

A fourth method is to collocate all of the sensor apertures into one box that is mounted on the vehicle, such as the roof, so that all sensor apertures are always aligned with respect to each other and the only alignment required is the alignment between this sensor aperture box and the vehicle body. This can be performed by using a set of accelerometers in the sensor aperture box and on the vehicle body frame or optically by using a video camera in the sensor aperture box.

Figure 13:
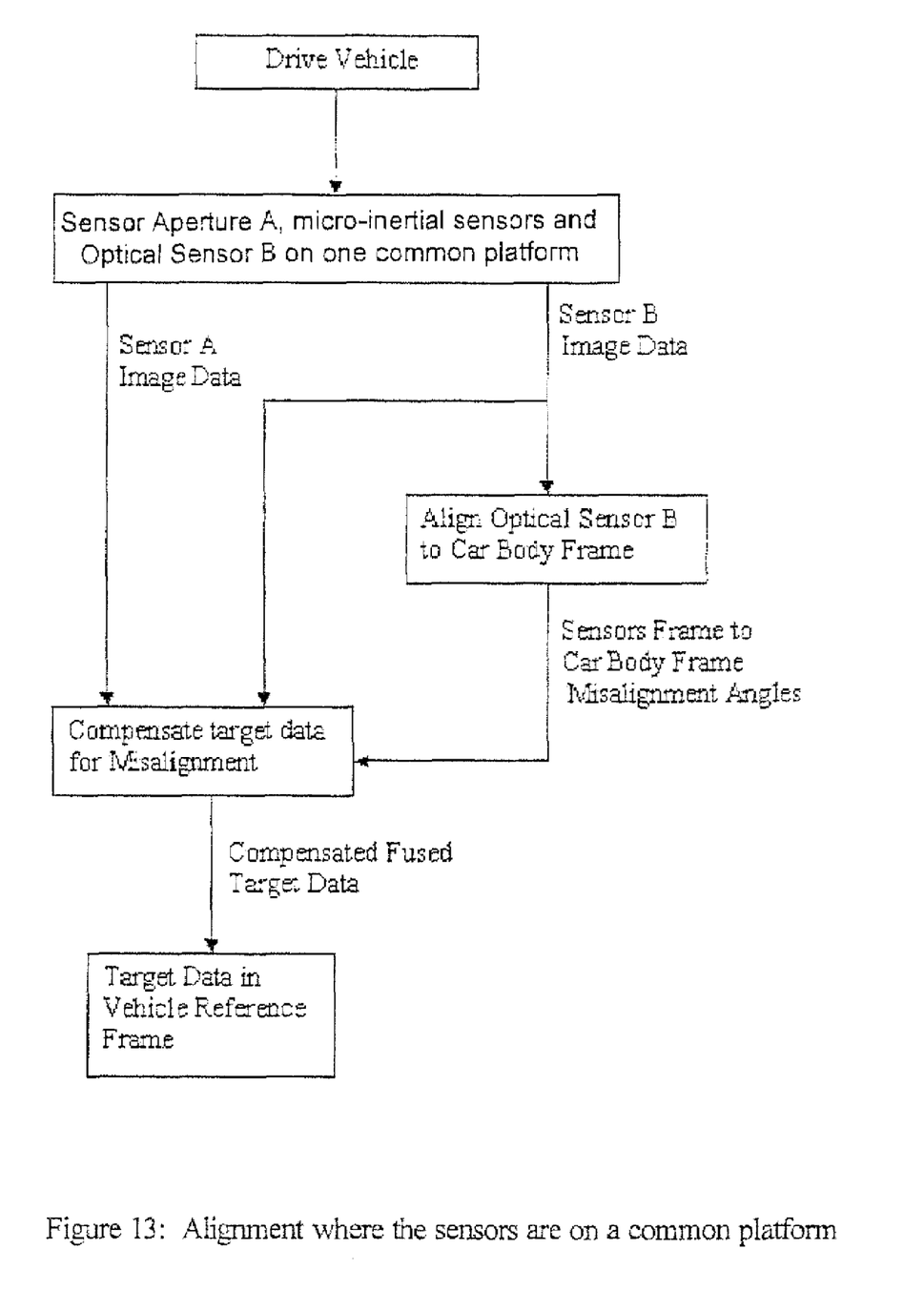
FIG. 13 is a flow chart that shows the alignment when the sensors are on a common platform.

FIG. 13 shows the case where all of the sensors are mounted onto one fixed platform. If one of the sensors is an optical sensor then it can be used to align the platform frame to the vehicle body frame as shown above. Once this set of misalignment angles is computed, then all of the target data from all of the sensors can be rotated to the common vehicle body reference frame. As shown above all of the target data is now in one reference frame for computing the optimal target tracks. If none of the sensors are optical, then a set of micro-inertials can be mounted on the common platform and also on the vehicle body. While the vehicle is moving the Kalman filter can now be used to compute the misalignment angles as discussed in the above paragraphs.

The systems described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

The invention claimed is:

1. A sensor alignment system for establishing and maintaining accurate alignment of automotive sensors comprising:
    a sensor mounted on an automotive vehicle for gathering target data around the vehicle using optical information;
    a micro inertial sensor included with the sensor that measures rotation rate and acceleration along two or more axes of the sensor for the establishment of a sensor reference frame;
    a separate micro inertial sensor independently mounted on the vehicle that measures rotation rate and acceleration along two or more axes of the vehicle for the establishment of a vehicle body reference frame; and
    a processor for determining an amount of misalignment of the sensor reference frame with the vehicle body reference frame and aligning the sensor target data with the vehicle body reference frame according to the amount of misalignment.

2. The system according to claim 1 wherein the processor is collocated with the sensor aperture and the micro-inertial sensor.

3. The system according to claim 2 wherein the alignment of the sensor target data to the vehicle body reference frame is done at the sensor.

4. The system according to claim 1 wherein the processor is located within a vehicle system processor, which includes a micro-inertial sensor.

5. The system according to claim 4 wherein the alignment of the sensor target data to the vehicle body reference frame is done within the vehicle system processor.

6. The system according to claim 1 wherein multiple sensors for gathering target data around the vehicle are mounted on the vehicle, each with micro-inertial sensors that are used to determine an amount of misalignment between the multiple sensors.

7. The system according to claim 6 wherein each sensor aligns itself to the vehicle body reference frame in a distributed process.

8. The system according to claim 6 wherein each sensor is aligned to the vehicle body reference frame in a vehicle system processor in a centralized process.

9. The system according to claim 6 wherein only one of the sensors aligns itself to the vehicle body reference frame.

10. The system according to claim 1 wherein the sensor includes a camera.

11. The system according to claim 10 wherein the amount of misalignment is determined according to a number of pixels of an image separating two of the axes.

12. The system according to claim 1 wherein the vehicle body and a vehicle hood are used to compute the amount of misalignment.

13. The system according to claim 12 wherein the vehicle hood is used to determine one of the two or more axes of the vehicle body reference frame.

14. A sensor alignment system for an automotive vehicle comprising:
    a first sensor mounted on the vehicle for gathering target data around the vehicle;
    a second sensor mounted on the vehicle for determining pitch, yaw or rotation of the vehicle;
    an alignment sensor included with each of the first and second sensors for measuring a state of the vehicle;
    a vehicle element within the field of view of the first sensor; the first sensor using the vehicle element to determine a reference axis; and
    one or more processors for determining a sensor misalignment of the first sensor according to an analysis of the visual data with respect to the reference axis and comparing a difference in the state of the vehicle measured by the first and second sensors to determine an alignment of the second sensor with respect to the reference axis.

15. The system according to claim 14 wherein the misalignment of the first sensor is determined in a processor located with the first sensor.

16. The system according to claim 15 wherein an alignment of the target data to the vehicle body reference frame is done at the first sensor.

17. The system according to claim 14 wherein the first sensor includes a video, radar, ultrasonic, laser or optical sensor.

18. The system according to claim 14 wherein an alignment of the target data to the vehicle body reference frame is done within a vehicle system processor.

19. The system according to claim 14 wherein the first sensor includes a camera.

20. The system according to claim 14 wherein each sensor aligns itself to the vehicle body reference frame in a distributed process.

21. The system according to claim 19 wherein each sensor is aligned to the vehicle body reference frame in a vehicle system processor in a centralized process.

22. The system according to claim 14 wherein the sensors comprise of accelerometers only.

23. The system according to claim 14 wherein the alignment sensors comprise of rotation rate sensors only.

24. The system according to claim 14 wherein the alignment sensors comprise of either accelerometers or rotation rate sensors.

25. The system according to claim 14 wherein the sensors comprise of single axis sensors.

26. The system according to claim 14 wherein the alignment sensors comprise of two axes sensors.

27. The system according to claim 14 wherein the first sensor is an imager with the vehicle element in the field of view of the imager, the imager accomplishing a static alignment to the vehicle body reference frame during an initialization procedure within the one or more processors.

28. The system according to claim 27 wherein the imager accomplishes a dynamic alignment to the vehicle body reference frame during routine driving operations.

29. The system according to claim 27 wherein the imager accomplishes a dynamic alignment to the vehicle body reference frame during non-routine or anomalous driving operations or conditions.

30. The system according to claim 14 wherein the first sensor acquires rotational rates and accelerations from micro-inertial sensors referenced to the vehicle body reference frame, compares differences to the second sensor, and applies a correction to align the second sensor to the vehicle body reference frame.

31. A sensor alignment system for an automotive vehicle comprising:
a first sensor mounted on the vehicle for gathering target data around the vehicle;
a second sensor mounted on the vehicle;
an optical sensor included with each of the first and second sensors;
a vehicle element within the field of view of the optical sensors, wherein the vehicle element is referenced to determine one or more vehicle axes that identify a vehicle body reference frame; and
one or more processors for determining sensor misalignment with the vehicle body reference frame by computing differences in the optical alignment at each sensor to align the target data with the vehicle body reference frame.

32. The system according to claim 31 wherein the first sensor is an imager with the vehicle element in the field of view of the imager; the imager accomplishing a static alignment to the vehicle body reference frame during the initialization procedure within the processor.

33. The system according to claim 32 wherein the imager accomplishes a dynamic alignment to the vehicle body reference frame during routine driving operations and conditions.

34. The system according to claim 32 wherein the imager accomplishes a dynamic alignment to the vehicle body reference frame during non-routine or anomalous driving operations or conditions.

35. The system according to claim 32 wherein the vehicle element is in the field of view of the optical sensors, each of the sensors aligning to the vehicle body reference frame independently in a distributed process according to an orientation of the vehicle element.

36. The system according to claim 35 wherein each sensor aligns to the vehicle body reference frame centrally in an integrated process.

37. The system according to claim 35 wherein each sensor includes a video, radar, ultrasonic, laser or optical sensor.

38. A sensor alignment system for an automotive vehicle comprising:
a first sensor for gathering target data around the vehicle;
a second sensor collocated with the first;
a micro inertial sensor included with the second sensor that measures rotation rate and acceleration along three axes of the sensor to determine a sensor reference frame;
a micro inertial sensor independently mounted on the vehicle that measures rotation rate and acceleration along three axes of the vehicle for determining a vehicle body reference frame;
a processor for determining sensor misalignment of the sensor reference frame with the vehicle body reference frame; and
a common mounting platform for mounting the first and second sensors including the micro inertial sensor to the vehicle such that each of the first and second sensors remain aligned with each other, wherein the common mounting platform is aligned to the vehicle body reference frame according to the sensor misalignment.

39. The system according to claim 38 wherein the target data is aligned with the vehicle body reference frame by comparing measurements of the micro inertial sensors.

40. The system according to claim 38 wherein the alignment of the common mounting platform to the vehicle body reference frame is done at the common mounting platform.

41. The system according to claim 38 wherein the processor is located within a vehicle system processor, which includes a micro-inertial sensor.

42. The system according to claim 38 wherein the alignment of the common mounting platform to the vehicle body reference frame is done within a vehicle system processor.

43. The system according to claim 42 wherein the first and second sensors and the common mounting platform aligns itself to the vehicle body reference frame in a distributed process.

44. The system according to claim 38 wherein the micro-inertial sensors comprise of accelerometers only.

45. The system according to claim 38 wherein the micro-inertial sensors comprise of rotation rate sensors only.

46. The system according to claim 38 wherein the micro-inertial sensors comprise of accelerometers and rotation rate sensors.

47. The system according to claim 38 wherein the micro-inertial sensors comprise of single axis sensors.

48. The system according to claim 38 wherein the micro-inertial sensors comprise of two axes sensors.

49. The system according to claim 38 wherein the first sensor is an imager with an element of the vehicle in the field of view of the imager, the imager accomplishing a static alignment to the vehicle body reference frame during the initialization procedure within the processor.

50. The system according to claim 49 wherein the imager accomplishes a dynamic alignment to the vehicle body reference frame during routine driving operations.

51. The system according to claim 49 wherein the imager accomplishes a dynamic alignment to the vehicle body reference frame during non-routine or anomalous driving operations or conditions.

52. A sensor alignment system for an automotive vehicle comprising:
- a first sensor mounted to the vehicle for acquiring target data around the vehicle;
- a second sensor independently mounted to the vehicle from the first sensor;
- an imager having a field of view including a vehicle element which is used as a reference to determine one or more vehicle axes that identifies a vehicle body reference frame; and
- a processor with a filter for determining sensor misalignment angles between the first and second sensors and for determining sensor misalignment angles of the sensors with the vehicle body reference frame in order to align the target data with the vehicle body reference frame such that target data information received from one sensor can be used in combination with target data information received from another sensor to obtain a kinematic state of targets around the vehicle.

53. The system according to claim 52 wherein the filter is a Kalman filter for comparing acceleration outputs.

54. The system according to claim 52 wherein the filter is a Kalman filter for comparing rotational rate outputs.

55. The system according to claim 53 wherein the misalignment angles determined by the Kalman filter will be used to compensate the sensor data.

56. The system according to claim 54 wherein the misalignment angles determined by the Kalman filter will be used to compensate the sensor data.

57. The system according to claim 54 wherein a Kalman filter is used to calibrate the inertial sensors by computing instrument bias and scale factor errors.

58. The system according to claim 52 wherein misalignment angles are determined using an image sensor and image processing steps.

* * * * *